US011321080B2

(12) United States Patent
Ren et al.

(10) Patent No.: US 11,321,080 B2
(45) Date of Patent: May 3, 2022

(54) PATCH PACKAGE GENERATION METHOD AND DEVICE

(71) Applicant: Huawei Technologies Co., Ltd., Guangdong (CN)

(72) Inventors: Wenjie Ren, Beijing (CN); Yonghong Yin, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/260,495

(22) PCT Filed: Jul. 19, 2018

(86) PCT No.: PCT/CN2018/096318
§ 371 (c)(1),
(2) Date: Jan. 14, 2021

(87) PCT Pub. No.: WO2020/014926
PCT Pub. Date: Jan. 23, 2020

(65) Prior Publication Data
US 2021/0311725 A1 Oct. 7, 2021

(51) Int. Cl.
*G06F 9/44* (2018.01)
*G06F 8/658* (2018.01)
*G06F 8/53* (2018.01)

(52) U.S. Cl.
CPC ............. *G06F 8/658* (2018.02); *G06F 8/53* (2013.01)

(58) Field of Classification Search
CPC .................................. G06F 8/658; G06F 8/53
See application file for complete search history.

(56) References Cited

U.S. PATENT DOCUMENTS 9,727,324 B2 * 8/2017 Zamir ...................... G06F 8/61
10,048,959 B2 * 8/2018 Sun ......................... H04L 29/08
(Continued)

FOREIGN PATENT DOCUMENTS

CN 102081535 A 6/2011
CN 102707977 A 10/2012
(Continued)

*Primary Examiner* — Anil Khatri
*Assistant Examiner* — Amir Soltanzadeh
(74) *Attorney, Agent, or Firm* — Womble Bond Dickinson (US) LLP

(57) ABSTRACT

This application provides a patch package generation method and a device, which includes: when code of an application framework layer in Android operating system source code is updated, obtaining, by a server, a compilation result; determining, by the server, an Android package (APK) of a target application from the APK of the preinstalled applications by, determining, by the server, an application including code in which only one or more of a check value, a timestamp, and a register corresponding to a constant change; and differentiating, by the server, an APK of an application other than the target application in the preinstalled applications after the code of the application framework layer is updated and an APK of the application other than the target application in the preinstalled applications before the code of the application framework layer is updated, to generate a first differential package. The first differential package is relatively small, therefore reducing computation amount in the terminal and air interface consumption.

13 Claims, 12 Drawing Sheets

(56) References Cited

U.S. PATENT DOCUMENTS

| | | | |
|---|---|---|---|
| 10,083,024 B2* | 9/2018 | Gopalakrishnan | H04L 67/34 |
| 10,360,017 B1* | 7/2019 | Salameh | G06F 8/658 |
| 10,678,527 B2* | 6/2020 | Oh | G06F 8/65 |
| 2014/0007075 A1* | 1/2014 | Sporkert | G06F 8/658 |
| | | | 717/173 |
| 2016/0291939 A1* | 10/2016 | Katoch | G06F 8/30 |
| 2017/0249140 A1* | 8/2017 | Sun | G06F 8/658 |
| 2019/0361684 A1* | 11/2019 | Carvalho | G06F 8/40 |

FOREIGN PATENT DOCUMENTS

| | | |
|---|---|---|
| CN | 105573785 A | 5/2016 |
| CN | 107168733 A | 9/2017 |
| WO | 2017193640 A1 | 11/2017 |

\* cited by examiner

FIG. 8b

PATCH PACKAGE GENERATION METHOD AND DEVICE

CROSS-REFERENCE TO RELATED APPLICATIONS

This application is a National Stage of International Application No. PCT/CN2018/096318 filed on Jul. 19, 2018, which is incorporated herein by reference in its entirety.

TECHNICAL FIELD

This application relates to the field of communications technologies, and in particular, to a patch package generation method and a device.

BACKGROUND

Currently, when a developer fixes an application framework layer problem of an Android terminal, an Android package (APK) of each application in an application layer is also updated due to an update of the application framework layer. For updated content of the application, a differential package may be currently generated by using a differential technology. Specifically, an APK of an old version of an application is compared with an APK generated after an update, and a differential part obtained through comparison is compressed into a differential package.

It can be learned from the foregoing differential technology that differential APKs are generated for the applications updated due to the update of the application framework layer. Therefore, when the problem of the application framework layer is being fixed, a server also needs to package the differential packages of these applications into a patch package of the application framework layer. Therefore, a finally generated patch package of the application framework layer is quite large (usually of hundreds of megabytes). When the terminal performs upgrading by using the patch package that is of the application framework layer and that is delivered by the server, a great loss is caused to air interface resources and user traffic.

SUMMARY

This application provides a patch package generation method and a device, to generate a patch package with a relatively small data volume, thereby reducing an amount of computation of running the patch package by a terminal, reducing air interface resource and traffic consumption, and increasing upgrade efficiency.

According to a first aspect, an embodiment of this application provides a patch package generation method. The method includes: When code of an application framework layer in Android operating system source code is updated, a server obtains a compilation result. The compilation result includes Android packages APKs of preinstalled applications in an application layer in the Android operating system source code after the code update and APKs of the preinstalled applications in the application layer in the Android operating system source code before the code update. Then the server determines an APK of a target application from the APKs of the preinstalled applications. The target application is an application including code in which only one or more of a check value, a timestamp, and a register corresponding to a constant change. The server differentiates an APK of an application other than the target application in the preinstalled applications after the code update and an APK of the application other than the target application in the preinstalled applications before the code update, to generate a first differential package.

In this embodiment of this application, a data volume of the first differential package generated by using the foregoing method is relatively small. When the server delivers the first differential package to a terminal, the terminal performs upgrading by using the first differential package, reducing an amount of computation of running a patch package by the terminal, reducing air interface resource consumption, and increasing upgrade efficiency.

In an embodiment, the compilation result obtained by the server may further include a system file of the application framework layer after the code update and a system file of the application framework layer before the code update. The server may differentiate the system file of the application framework layer after the code update and the system file of the application framework layer before the code update, to generate a second differential package. Then the server combines the first differential package and the second differential package into one patch package, and sends the patch package to the terminal, or separately sends the first differential package and the second differential package to the terminal. The patch package generated in this way includes only the second differential package of the application framework layer and the first differential package of the target application. In comparison with the prior art, a data volume of the patch package is reduced, air interface resource consumption can be reduced, and using this patch package to perform upgrading by the terminal can also reduce traffic consumption.

In an embodiment, the server obtains, from the compilation result, an APK of a first application after the code update and an APK of the first application before the code update. The first application is one of the preinstalled applications. Then, when determining that the APKs of the first application before and after the code update are different, the server decompiles a system file in the APK of the first application after the code update into first source code, and decompiles a system file in the APK of the first application before the code update into second source code.

Then the server determines whether the first source code and the second source code differ only in one or more of a check value, a timestamp, and a register corresponding to a constant. If yes, the server determines that the first application is the target application, and determines that the APK of the first application is the APK of the target application.

In this embodiment of this application, if the first source code and the second source code of the first application differ only in the check value, the timestamp, and the register corresponding to the constant, it may indicate that function implementation of the first application does not change, and therefore the first application does not need to be packaged into a patch package. In this way, the server finally differentiates only the APK of the application other than the target application to generate a first differential package, so that a file size of a patch package that is finally generated and sent can be reduced, thereby reducing an amount of computation of running the patch package by the terminal, reducing air interface resource consumption, and increasing upgrade efficiency.

In an embodiment, the server may determine, in the following manner, whether the first source code and the second source code differ only in the register corresponding to the constant: The server first determines, through comparison, whether the first source code is different from the second source code. If the first source code is different from the second source code, the server converts the first source code into a first semantic tree and converts the second source code into a second semantic tree. If the transposed first semantic tree is the same as the second semantic tree, the server determines that the first source code and the second source code differ only in the register corresponding to the constant.

In this embodiment of this application, the server can determine that the code of the first application differs only in the register corresponding to the constant, and the function implementation of the first application does not change.

In an embodiment, the server may determine, in the following manner, whether the first source code and the second source code differ only in one or both of the check value and the timestamp:

The server determines, through comparison, whether the first source code is different from the second source code. If the first source code is different from the second source code, the server determines whether a field corresponding to different code parts of the first source code and the second source code is a timestamp field. If yes, the server determines that the first source code and the second source code differ only in the check value.

In an embodiment, the server may determine, in the following manner, whether the first source code and the second source code differ only in one or both of the check value and the timestamp:

The server determines, through comparison, whether the first source code is different from the second source code. If the first source code is different from the second source code, the server determines whether a field corresponding to different code parts of the first source code and the second source code is a check value field. If yes, the server determines that the first source code and the second source code differ only in the timestamp.

In this embodiment of this application, the server can determine that the code of the first application differs only in the timestamp and the check value, and the function implementation of the first application does not change.

In another embodiment, the server obtains, from the compilation result, an APK of a first application after the code update and an APK of the second application before the code update. The second application is one of the preinstalled applications. Then, when determining that the APKs of the second application before and after the code update are different, the server obtains, from the Android operating system source code, third source code of the second application after the code update and fourth source code of the second application before the code update. When finding, through comparison, that the third source code is the same as the fourth source code, the server determines that the APK of the first application is the APK of the target application.

In this embodiment of this application, if the server determines that the third source code is the same as the fourth source code, it indicates that the code of the first application does not change, and therefore function implementation of the first application does not change. Therefore, the first application does not need to be packaged into a patch package. In this way, a file size of a patch package that is finally generated and sent can be reduced, thereby reducing an amount of computation of running the patch package by the terminal, reducing air interface resource consumption, and increasing upgrade efficiency.

According to a second aspect, an embodiment of this application provides a server, including a processor and a memory. The memory is configured to store one or more computer programs, Android operating system source code, and a compilation result generated by compiling the Android operating system source code. The compilation result generated by compiling the Android operating system source code includes APKs of preinstalled applications in an application layer in the Android operating system source code after the code update, APKs of the preinstalled applications in the application layer in the Android operating system source code before the code update, a system file of the application framework layer after the code update, and a system file of the application framework layer before the code update. In addition, the Android operating system source code includes source code of the preinstalled applications in the application layer in the Android operating system source code after the code update and source code of the preinstalled applications in the application layer in the Android operating system source code before the code update. When the one or more computer programs stored in the memory are executed by the processor, the server can implement the method according to any possible design of the first aspect.

According to a third aspect, an embodiment of this application further provides a server. The server includes modules/units for performing the method according to any one of the first aspect and the possible designs of the first aspect. These modules/units may be implemented by hardware, or may be implemented by hardware by executing corresponding software.

According to a fourth aspect, an embodiment of this application further provides a computer readable storage medium. The computer readable storage medium includes a computer program, and when the computer program runs on a server, the server performs the method according to any one of the first aspect and the possible designs of the first aspect.

According to a fifth aspect, an embodiment of this application further provides a computer program product. When the computer program product runs on a server, the server performs the method according to any one of the first aspect and the possible designs of the first aspect.

These aspects or other aspects of this application are clearer and more comprehensible in descriptions of the following embodiments.

BRIEF DESCRIPTION OF DRAWINGS

FIG. 8b is a schematic diagram of a source code comparison result according to an embodiment of this application;

DESCRIPTION OF EMBODIMENTS

The following further describes in detail the embodiments of this application with reference to accompanying drawings.

A differential technology is often applied to an over the air (OTA) upgrade. An application and content service provider can distribute a new version of software, configurations and settings of the software, and a new key through an air interface. Through OTA, an end user only needs to perform a simple operation, to download, to a terminal by using the OTA mechanism based on personal preferences, various service menus provided by the application and content service provider, and to customize a specific service according to wills of the user.

Figure 1:
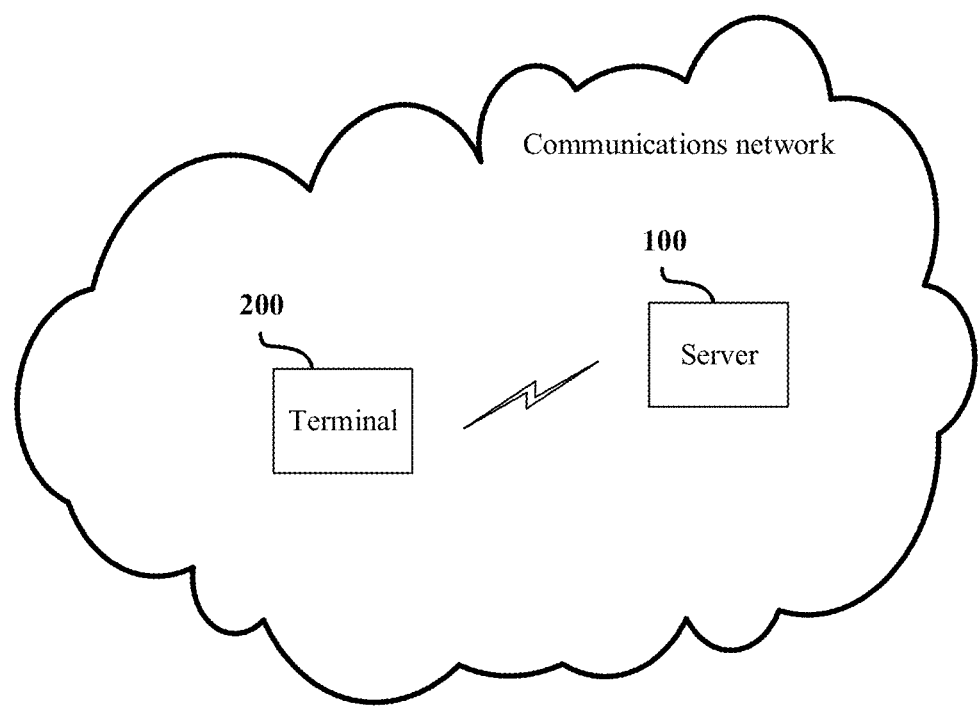
FIG. 1 is a schematic diagram of an OTA application scenario according to an embodiment of this application.

FIG. 1 shows a scenario architecture of an OTA upgrade according to an embodiment of this application. The scenario architecture includes a server 100 and a terminal 200. The terminal 200 and the server 100 communicate with each other through a communications network. The communications network may be a local area network, or may be a wide area network interconnected by using a relay device. When the communications network is a local area network, for example, the communications network may be a short-range communications network such as a Wi-Fi hotspot network, a Wi-Fi direct network, a Bluetooth network, a ZigBee network, or a near field communication (NFC) network. When the communications network is a wide area network, for example, the communications network may be the 3rd generation mobile communications technology (3G) network, the 4th generation mobile communications technology (4G) network, the 5th generation mobile communications technology (5G) network, a future evolved public land mobile network (PLMN), or the Internet.

The server 100 stores a package. The package is usually uploaded to the server by a developer of the package. The package may fall into two types: a differential APK and a full APK.

The terminal 200 downloads the package from the server, locally stores the package, and updates installed software on the terminal. When obtaining the full APK from the server, the terminal 200 directly uses the full APK to perform upgrading. When obtaining the differential APK from the server, the terminal 200 combines the differential APK and an image file installed on the terminal 200 into a new APK, and uses the new APK to perform upgrading.

Figure 2:
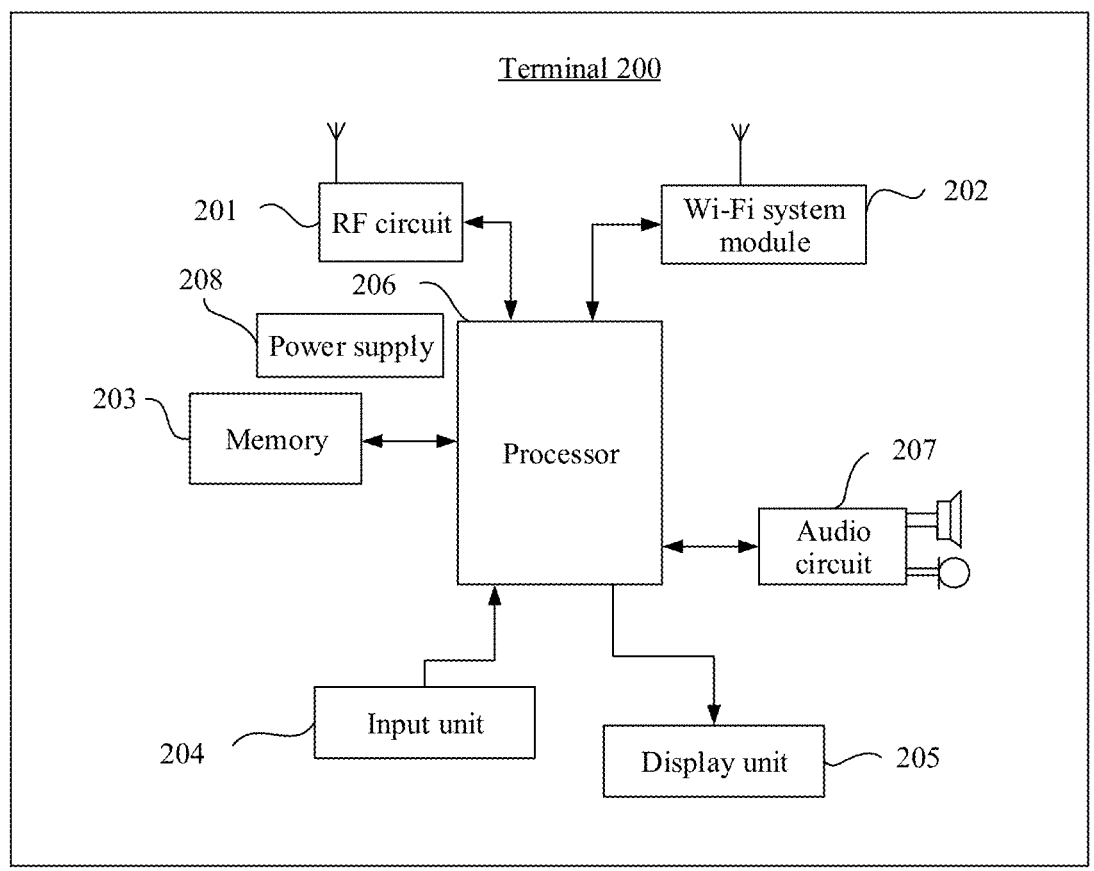
FIG. 2 is a schematic structural diagram of a terminal according to an embodiment of this application.

For example, the terminal 200 may be a terminal device such as a mobile phone, a tablet computer, a notebook computer, an ultra-mobile personal computer (UMPC), a netbook, or a personal digital assistant (PDA). The following describes an example in which the terminal is a mobile phone. FIG. 2 is a block diagram of some structures of the terminal 200 related to the embodiments of the present application.

As shown in FIG. 2, the terminal 200 is a mobile phone, and the mobile phone includes components such as an RF (radio frequency) circuit 201, a Wi-Fi system module 202, a memory 203, an input unit 204, a display unit 205, a processor 206, an audio circuit 207, and a power supply 208. A person skilled in the art may understand that a structure of the mobile phone shown in FIG. 200 constitutes no limitation on the mobile phone, and the mobile phone may include more or fewer components than those shown in the figure, or some components may be combined, or different component deployments may be used.

The following describes each composition part of the terminal 200 in detail with reference to FIG. 2.

The Wi-Fi system module 202 is configured to scan a Wi-Fi access point that exists in an environment around the terminal 200, to obtain related information, so that the terminal 200 accesses the Wi-Fi access point based on the related information.

The RF circuit 201 is configured to receive and send information, or receive and send a signal during a call. In particular, after receiving downlink information of a base station, the RF circuit 201 sends the downlink information to the processor 206 for processing. In addition, the radio frequency circuit sends uplink data to the base station. In this embodiment of this application, the RF circuit 201 is connected to a Wi-Fi antenna of the Wi-Fi system module, and controls the Wi-Fi antenna to scan a Wi-Fi network. Usually, the RF circuit 201 includes, but is not limited to, an antenna, at least one amplifier, a transceiver, a coupler, a low noise amplifier (LNA), a duplexer, and the like. In addition, the RF circuit 201 may further communicate with a network and another device through wireless communication.

The memory 203 is configured to store a software program of the terminal 200. Usually, the memory 203 may include a high speed random access memory, and may further include a nonvolatile memory, for example, at least one magnetic disk storage device, a flash memory, or another volatile solid-state storage device.

The processor 206 is a control center of the terminal 200. The processor 206 is connected to parts of the entire mobile phone through various interfaces and cables, runs or executes the software program stored in the memory 203, and invokes data stored in the memory 203, to perform various functions of the terminal 200 and process data. The processor 206 may include one or more processing units. Preferably, the processor 206 may integrate an application processor and a modem processor. The application processor mainly processes an operating system, a user interface, an application program, and the like. The modem processor mainly processes wireless communication. It may be understood that the modem processor may alternatively be not integrated into the processor 206.

The input unit 204 may be configured to receive input digital or character information, and generate a key signal input related to user setting and function control of the terminal 200. The input unit 204 may include a touchscreen and another input device. The touchscreen, also referred to as a touch panel, may detect a touch operation of a user that is performed on or nearby the touchscreen, and drive a corresponding connection apparatus according to a preset program. The another input device may include but is not limited to one or more of a physical keyboard, a function key (such as a volume control key or a power on/off key), a trackball, a mouse, a joystick, or the like.

The display unit 205 may be configured to display information entered by the user or information provided to the user, and various menus of the mobile phone 200. The display unit 205 may include a display panel. In an embodiment, the display panel may be configured in the form of a liquid crystal display (LCD), an organic light-emitting diode (OLED), or the like.

The audio circuit 207 is connected to a speaker and a microphone, and may provide an audio interface between the user and the mobile phone 200. The audio circuit 207 may transmit, to the speaker, an electrical signal converted from received audio data, and the speaker converts the electrical signal into a sound signal for output. In addition, the microphone converts a collected sound signal into an electrical signal. The audio circuit receives the electrical signal, converts the electrical signal into audio data, and then outputs the audio data to the RF circuit 201, to send the audio data to, for example, another mobile phone, or outputs the audio data to the memory 203 for further processing.

The mobile phone 200 further includes the power supply 208 (such as a battery) that supplies power to each component. Preferably, the power supply may be logically connected to the processor 206 by using a power management system, to implement functions such as charging management, discharging management, and power consumption management by using the power management system.

Although not shown, the terminal 200 may further include a Bluetooth module, a sensor, a GPS, and the like. Details are not described herein.

In addition, a software system of the terminal 200 may use a layered architecture, an event-driven architecture, a microkernel architecture, a microservice architecture, or a cloud architecture. In the embodiments of the present application, an Android system with the layered architecture is used as an example to describe a software structure of the terminal 200.

Figure 3:
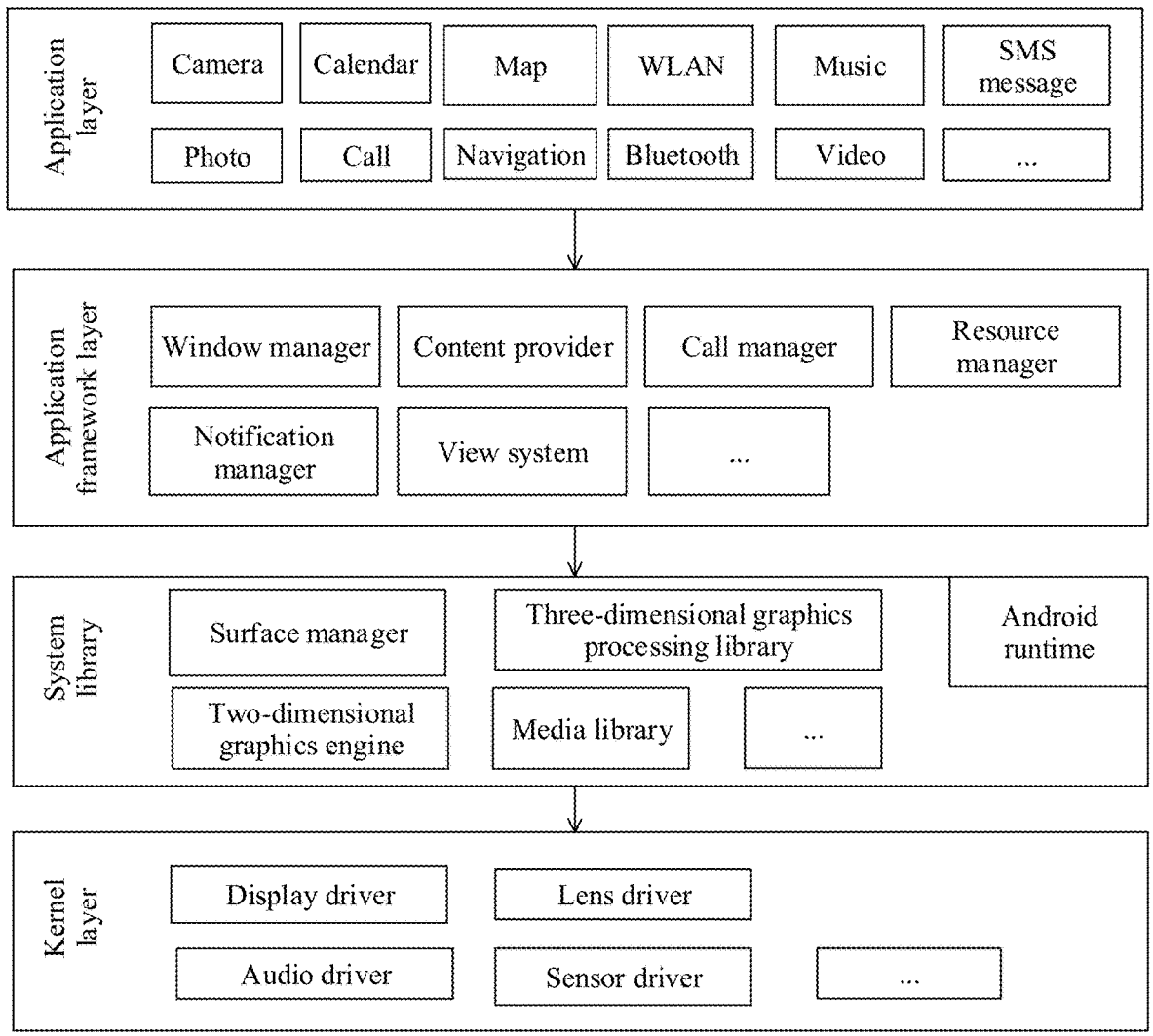
FIG. 3 is a schematic architectural diagram of a terminal operating system according to an embodiment of this application.

FIG. 3 is a structural block diagram of software of a terminal 200 according to an embodiment.

The software is divided into several layers by using the layered architecture, and each layer has clear roles and responsibilities. The layers communicate with each other by using a software interface. In some embodiments, the Android system is divided into four layers, namely, an application program layer, an application framework layer, Android runtime, a system library, and a kernel layer from top to bottom.

The application program layer may include a series of application packages.

As shown in FIG. 3, the application packages may include application programs such as camera, gallery, calendar, phone, map, navigation, WLAN, Bluetooth, music, video, and SMS message.

The application framework layer provides an application programming interface (API) and a programming framework for an application program at the application program layer. The application framework layer includes some predefined functions.

As shown in FIG. 3, the application framework layer may include a window manager, a content provider, a view system, a telephone manager, a resource manager, a notification manager, and the like.

The window manager is configured to manage a window program. The window manager may obtain a size of a display, determine whether there is a status bar, perform screen locking, take a screenshot of the display, and the like.

The content provider is configured to: store and obtain data, and make the data accessible to an application program. The data may include a video, an image, audio, calls that are made and received, a browsing history and bookmarks, an address book, and the like.

The view system includes visual controls such as a control for displaying text and a control for display a picture. The view system can be used to construct an application program. A display interface may include one or more views. For example, a display interface including an SMS message notification icon may include a text display view and a picture display view.

The phone manager is configured to provide a communication function of the terminal 200, for example, management of call statuses (including a connected state, a disconnected state, and the like).

The resource manager provides various resources for an application program, such as localized strings, icons, pictures, layout files, and video files.

The notification manager enables an application program to display notification information in a status bar, and may be configured to convey a notification-type message. The notification-type message may automatically disappear after the message is displayed for a short period of time, without user interaction. For example, the notification manager is configured to notify that download is completed, a message reminder, and the like. The notification manager may alternatively be a notification that appears on the top of a status bar of a system in a text form of a graph or a scroll bar, for example, a notification of an application program running in the background or a notification that appears on a screen in a form of a dialog window. For example, text information is prompted in the status bar, an alert sound is produced, the electronic device vibrates, or the indicator light blinks.

The Android runtime includes a kernel library and a virtual machine, and the Android runtime is responsible for scheduling and management of the Android system.

The kernel library includes two parts: a function that needs to be invoked by a Java language and a kernel library of Android.

The application program layer and the application program framework layer run on the virtual machine. The virtual machine executes a Java file at the application program layer and the application program framework layer as a binary file. The virtual machine is configured to perform functions such as object lifecycle management, stack management, thread management, security and exception management, and garbage collection.

The system library may include a plurality of function modules, for example, a surface manager, a media library (or Media Libraries), a three-dimensional graphics processing library (for example, OpenGL ES), and a 2D graphics engine (for example, SGL).

The surface manager is configured to: manage a display subsystem, and provide fusion of 2D and 3D layers for a plurality of applications.

The media library supports playback and recording of a plurality of commonly used audio and video formats, static image files, and the like. The media library may support a plurality of audio and video coding formats such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

For example, the following describes a working process of software and hardware of an electronic device 100 with reference to a capturing and photographing scenario.

When a touch sensor 180K receives a touch operation, a corresponding hardware interrupt is sent to a kernel layer. The kernel layer processes the touch operation into an original input event (including information such as touch coordinates and a timestamp of the touch operation). The original input event is stored in the kernel layer. An application framework layer obtains the original input event from the kernel layer, and identifies a control corresponding to the input event. In an example in which the touch operation is a touch tap operation, and a control corresponding to the tap operation is a control of a camera application icon, a camera application calls an interface of the application framework layer to start the camera application and further start a lens driver by calling the kernel layer, so as to capture a static image or a video by using a lens.

In this embodiment of this application, a patch package sent by the server 100 to the terminal 200 is usually a differential package. Because the differential package usually has only a few megabytes, user traffic consumed for upgrading can be greatly reduced. The differential package is generated by the server 100 by using a differential technology. Generally, there are two types of differential technologies: block-based differentiation (for example, an open source tool bsdiff) and file-based differentiation (for example, an open source tool imgdiff).

Figure 4A:
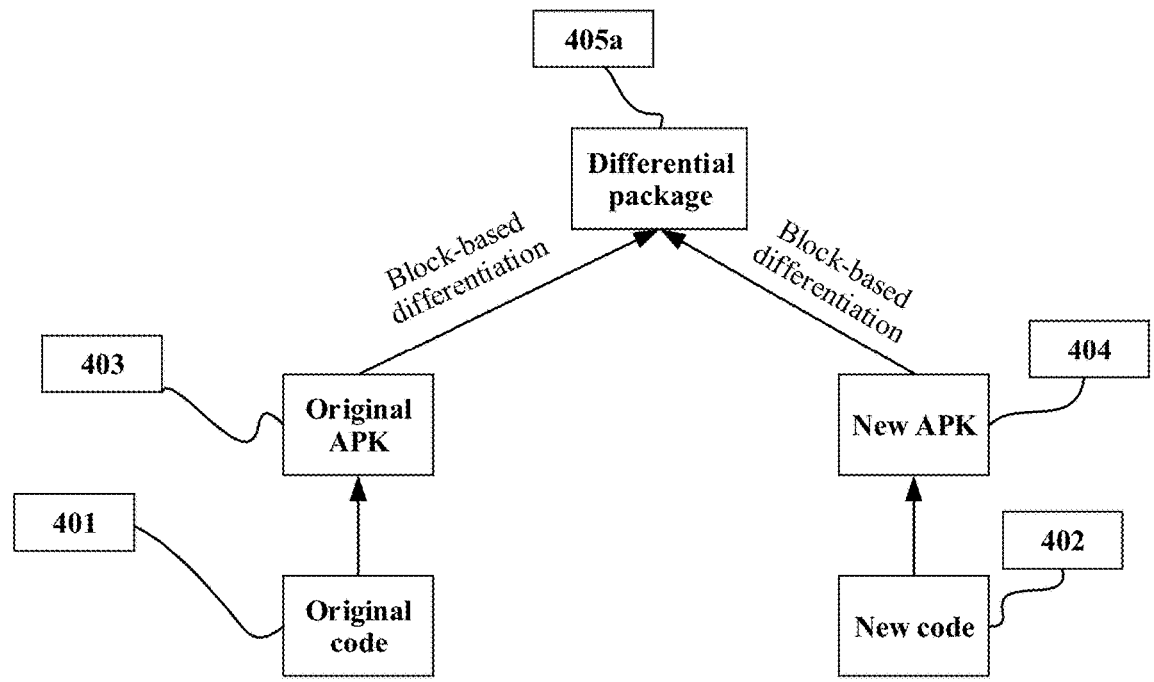
FIG. 4a and FIG. 4b are a schematic diagram of a differential method according to an embodiment of this application.
Figure 4B:
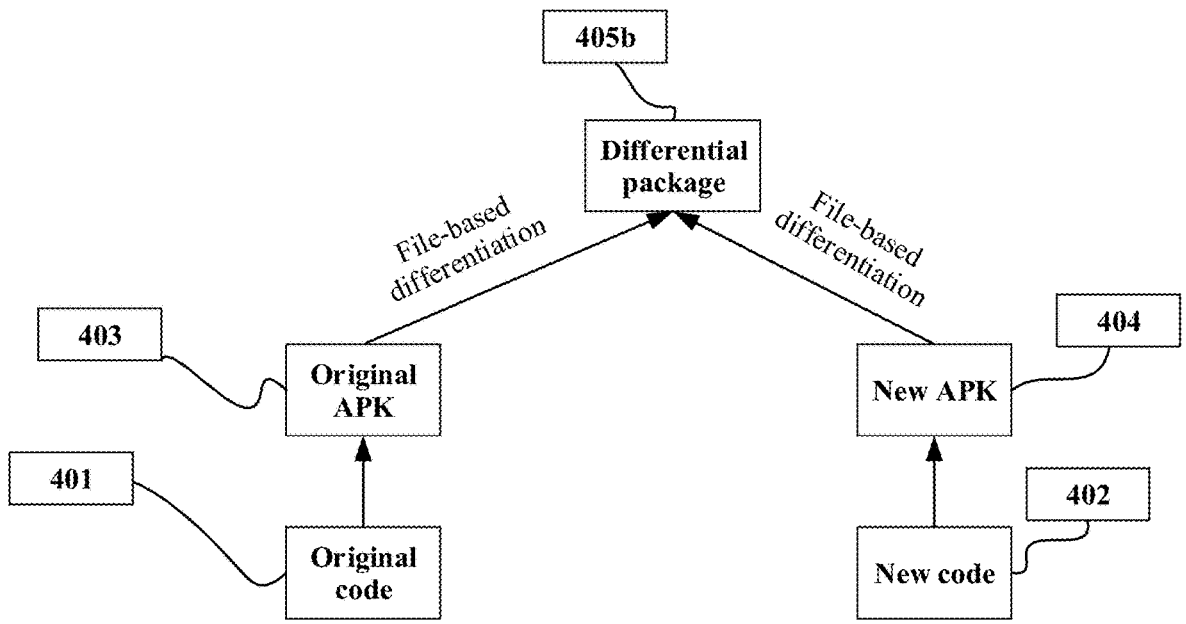

As shown in FIG. 4a and FIG. 4b, original code 401 is source code of an application before a system update, and new code 402 is source code generated by updating the original code 401. The original code 401 and the new code 402 may be compiled to generate an APK file. An APK 403 is an Android package generated by compiling the original source code, and an APK 404 is an Android package generated by compiling the new code. A differential package 405a is generated when the APK 403 and the APK 404 are differentiated by using the open source tool bsdiff, and a differential package 405b is generated when the APK 403 and the APK 404 are differentiated by using the open source tool imgdiff. Through comparison, a file size of the differential package 405a is larger than that of the differential package 405b, but a speed at which the terminal combines an image file and the differential package 405a obtained from the server is higher; a file of the differential package 405b is smaller, but a speed at which the terminal combines the image file and the differential package 405a obtained from the server is lower.

Currently, no differential technology can accurately locate a correspondence between a code change part and a differential file in a differential package. Therefore, the following case often occurs: A differential package is quite large (for example, of hundreds of megabytes) due to a small change in code. In particular, when a developer of a terminal fixes a problem of an application framework layer, a finally generated patch package includes differential APKs of many applications, and consequently, the finally generated patch package is quite large.

To resolve this problem, an embodiment of this application provides a patch package generation method. In this method, when an application framework layer is being repaired, a server determines, from preinstalled applications in operating system source code, target applications that change only in a check value, a timestamp, and a register corresponding to a constant. The preinstalled applications are a preinstalled application in the Android operating system source code released by Google and an application preinstalled by different manufacturers on the basis of the Android operating system source code released by Google. These preinstalled applications are different from third-party applications downloaded by a user from an application store, mainly because these preinstalled applications have a characteristic of being unable to be deleted from a user terminal. After determining the target applications, the server generates a first differential package of an application other than these target applications in the preinstalled applications. In this way, in comparison with the prior art, a data volume of the first differential package generated by the server is relatively small, thereby reducing an amount of computation of running a patch package by the terminal, reducing air interface resource and traffic consumption, and increasing upgrade efficiency.

Figure 5:
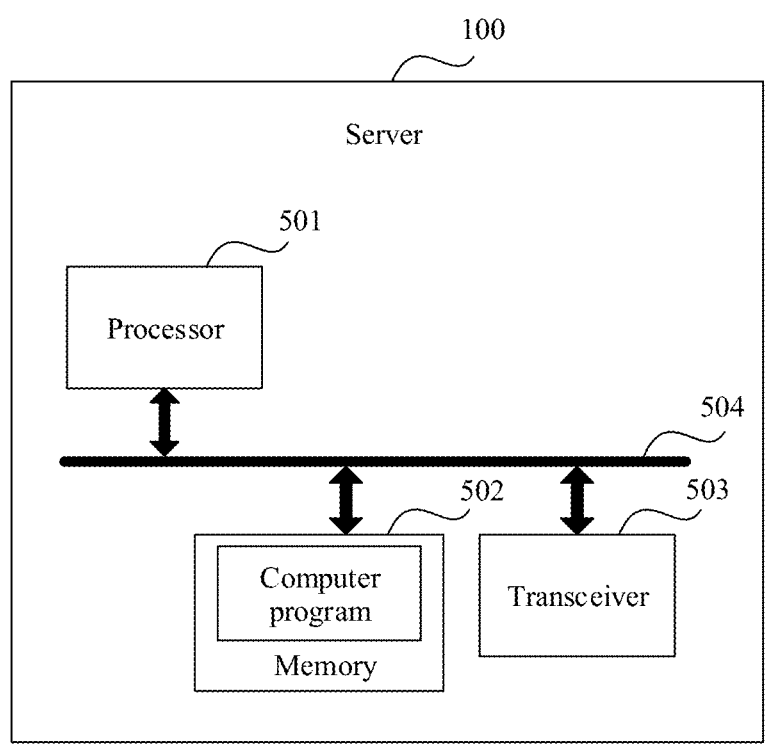
FIG. 5 is a schematic architectural diagram of a server according to an embodiment of this application.

For example, the server 100 configured to perform the patch package generation method may be a server with a compilation function or a cloud server. FIG. 5 is a block diagram of a partial structure of the server 100 related to the embodiments of this application.

As shown in FIG. 5, the server 100 may include a processor 501, a memory 502, and a transceiver 503. The one or more computer programs are stored in the memory 501 and configured to be executed by the one or more processors 502.

The processor 501 may be a central processing unit (CPU), a digital processing unit, or the like. As a control center of the server 100, the processor 501 is connected to all parts of the entire server by using various interfaces and lines, and performs various functions and data processing of the server 100 by running or executing the computer programs stored in the memory 502 and invoking data stored in the memory 502.

The memory 502 is configured to store a to-be-run computer program. If the server 100 is a cloud server, the memory 502 further stores a compilation result that is generated by an Android operating system through compilation and obtained from a server with a compilation function. The compilation result includes APKs of preinstalled applications in an application layer in the Android operating system source code after a code update, APKs of the preinstalled applications in the application layer in the Android operating system source code before the code update, a system file of the application framework layer after the code update, and a system file of the application framework layer before the code update. In addition, the memory 502 further stores source code of the preinstalled applications that is obtained from the server with a compilation function. The source code of the preinstalled applications mainly includes source code of the preinstalled applications in the application layer in the Android operating system source code after the code update and source code of the preinstalled applications in the application layer in the Android operating system source code before the code update.

In addition, if the server 100 is a server with a compilation function, the memory 502 stores Android operating system source code and a compilation result generated by compiling the Android operating system source code. The Android operating system source code includes at least code of an application framework layer and source code of preinstalled applications in an application layer.

The compilation result includes APKs of the preinstalled applications in the application layer in the Android operating system source code after a code update, APKs of the preinstalled applications in the application layer in the Android operating system source code before the code update, a system file of the application framework layer after the code update, and a system file of the application framework layer before the code update. In addition, the source code of the preinstalled applications in the application layer mainly includes source code of the preinstalled applications in the application layer in the Android operating system source code after the code update and source code of the preinstalled applications in the application layer in the Android operating system source code before the code update.

The transceiver 503 is configured to send a patch package generated by the processor 501 to a terminal side.

In this embodiment of this application, a specific connection medium between the processor 501 and the memory 502 is not limited. In this embodiment of this application, the memory 502, the processor 501, and the transceiver 503 are connected by using a bus 504 in FIG. 4. The bus is represented by using a thick line in FIG. 4. A manner of connection between other components is merely an example for description, and imposes no limitation. The bus may be classified into an address bus, a data bus, a control bus, and the like. For ease of representation, only one thick line is used to represent the bus in FIG. 4, but this does not mean that there is only one bus or only one type of bus.

The memory 502 may be a volatile memory such as a random access memory (RAM). Alternatively, the memory 503 may be a non-volatile memory such as a read-only memory, a flash memory, a hard disk drive (HDD), or a solid-state drive (SSD). Alternatively, the memory 502 is any other medium that can be used to carry or store expected program code in a form of an instruction or a data structure and can be accessed by a computer. The memory 503 may be a combination of the foregoing memories.

When the one or more computer programs stored in the memory 502 are executed by the processor 501, the server 100 performs the following processing process:

When code of the application framework layer in the Android operating system source code is updated, the processor 501 of the server 100 obtains the compilation result from the memory 502. Because the compilation result includes the APKs of the preinstalled applications in the application layer in the Android operating system source code after the code update and the APKs of the preinstalled applications in the application layer in the Android operating system source code before the code update, the processor 501 determines an APK of a target application from the APKs of the preinstalled applications. The target application is an application including code in which only one or more of a check value, a timestamp, and a register corresponding to a constant change. After determining the target application, the server generates a first differential package of an application other than the target application in the preinstalled application. In this way, in comparison with the prior art, a data volume of the first differential package generated by the server is relatively small, thereby reducing an amount of computation of running a patch package by a terminal, reducing air interface resource consumption, and increasing upgrade efficiency.

For example, the application framework layer provides an activity manager service (ActivityManagerService, AMS) module, and the AMS mainly provides the following functions: (1) scheduling activities of all applications together; (2) performing memory management; and (3) performing process management. If the application framework layer changes an API interface onCreate( ), many applications in the application layer may change. In one case, preinstalled applications calling the API interface onCreate( ) may change. In another case, some applications do not call the API interface onCreate( ). However, because the API interface onCreate( ) changes, a check value of an image file of the application framework layer changes, or a timestamp of an image file of the application framework layer changes, preinstalled applications associated with the image file of the application framework layer changes. In the prior art, APKs of all preinstalled applications that change may be differentiated to generate differential packages, and all the differential packages are packaged into a patch package of the application framework layer. However, in the foregoing implementation solution provided in this application, the server may differentiate only APKs of preinstalled applications meeting the first case, to generate differential packages, and then package only these differential packages into a patch package of the application framework layer. Therefore, a quantity of differential files in a finally generated patch package can be reduced. In addition, after the terminal updates the patch package, an amount of computation of running the patch package by the terminal is reduced, air interface resource consumption is reduced, and upgrade efficiency is increased.

In the embodiments of this application, the foregoing patch package generation method is further described in detail with reference to FIG. 6A to FIG. 9B.

Figure 6A:
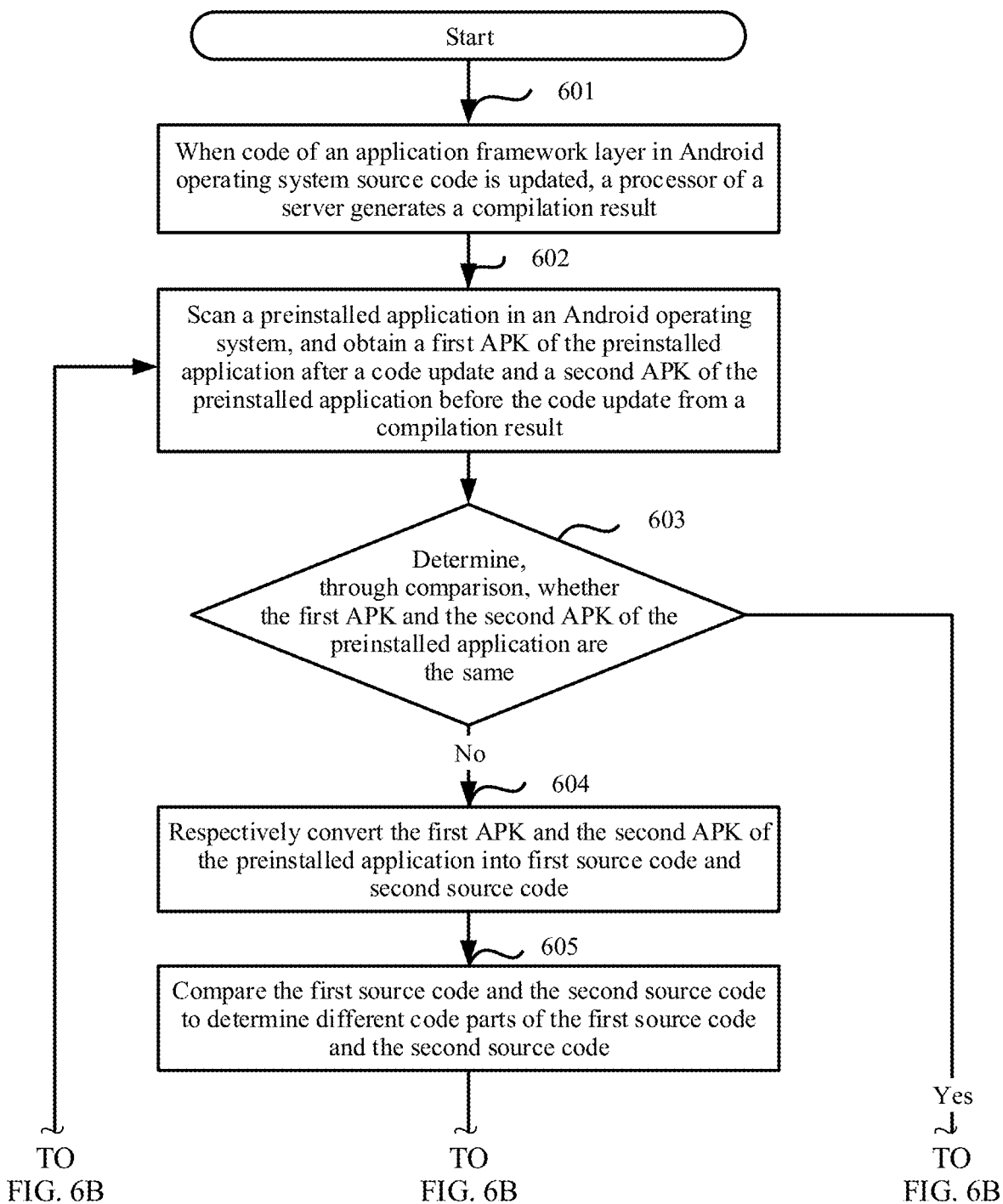
FIG. 6A and FIG. 6B are a schematic flowchart of a patch package generation method according to an embodiment of this application.
Figure 6B:
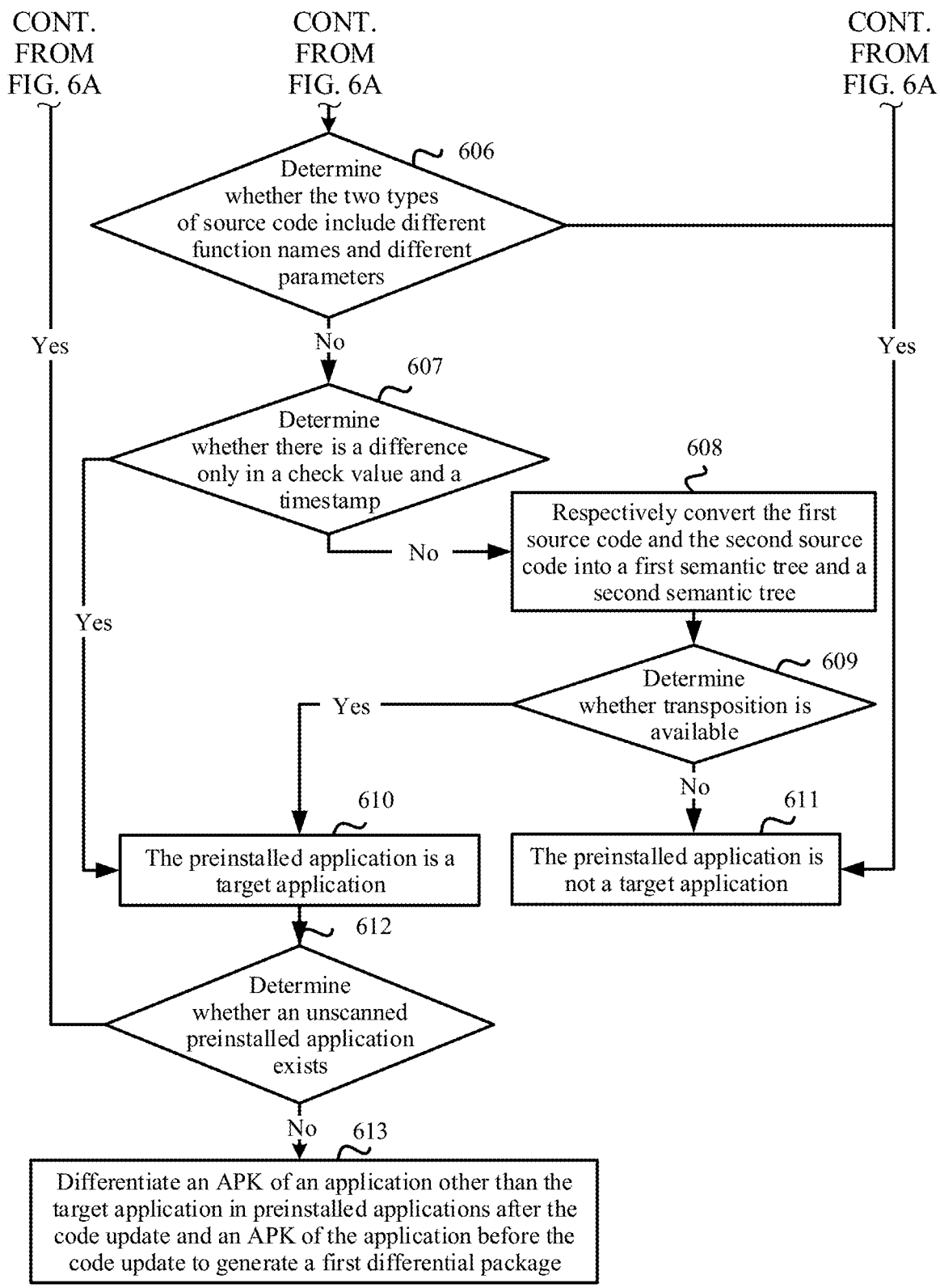

FIG. 6A and FIG. 6B are a schematic flowchart of a patch package generation method according to an embodiment of this application. The steps are as follows.

Step 601: When code of an application framework layer in Android operating system source code is updated, a processor of a server generates a compilation result, where the compilation result includes APKs of preinstalled applications in an application layer in the Android operating system source code after the code update. The compilation result is stored in a memory of the server. In addition, the memory further stores APKs of the preinstalled applications in the application layer in the Android operating system source code before the code update.

The APK of the preinstalled application may include META-INF (which can often be seen in a Jar file), res (directory for storing resource files), AndroidManifest.xml (global configuration file of a program), classes.dex (Dalvik byte code), and resources.arsc (compiled binary resource file). It should be noted that classes.dex may also be extracted to generate an .odex file. In this case, a differential APK includes META-INF, res, AndroidManifest.xml, resources.arsc, and the .odex file outside the APK. A function of extracting classes.dex in advance is to speed up software loading and startup.

Step 602: The processor scans an APK of a preinstalled application in the compilation result. For example, if the preinstalled application is a first application, the processor obtains, from the memory, a first APK of the first application after the code update and a second APK of the first application before the code update.

Step 603: The processor determines, through comparison, whether the APKs of the preinstalled application before and after the code update are the same; and if the APKs of the preinstalled application before and after the code update are different, continues to perform step 604 to step 613; otherwise, jumps to step 611.

System files included in both the first APK and the second APK may be .dex files, or may be .odex files. The processor may compare the system files in the APKs by using a text file comparison tool. If a system file in an APK has been encrypted or optimized, the processor needs to decrypt and expand the system file before performing comparison on the system file. For example, if a system file is an .odex file, the processor needs to process the file by using a dump tool before comparison, and then performs comparison on the processed file by using the text file comparison tool.

Step 604: The processor performs decompilation processing on the system file in the first APK and the system file in the second APK of the preinstalled application, to respectively obtain first source code corresponding to the first APK and second source code corresponding to the second APK.

In the decompilation process, a hierarchical progressive method may be used, to first locate a file and then locate a function and locate a code segment. For example, a file name is used to locate the file, a function name is used to locate the function, and a feature character string is used to locate the code segment.

Step 605: The processor compares the first source code and the second source code of the preinstalled application, to determine different code parts of the first source code and the second source code.

Step 606: The processor determines whether the different code parts of the first source code and the second source code include different function names and different parameter variables; and if yes, jumps to step 611; otherwise, continues to perform step 607 to step 613.

Step 607: The processor determines whether the different parts of the first source code and the second source code include a difference only in one or both of a check value and a timestamp; and if no, performs step 608 to step 613; or if yes, jumps to step 610.

Step 608: The processor respectively converts the first source code and the second source code into a first semantic tree and a second semantic tree.

Step 609: The processor determines whether the transposed first semantic tree is the same as the second semantic tree; and if yes, performs step 610; otherwise, performs step 611.

Step 610: The processor determines that the preinstalled application is a target application.

Step 611: The processor determines that the preinstalled application is not a target application.

Step 612: The processor determines whether an unscanned preinstalled application exists in the compilation result, and if yes, performs step 602 to step 611 again.

Step 613: The processor determines an application other than the target application in the preinstalled applications, and differentiates an APK of the application after the code update and an APK of the application before the code update to generate a first differential package.

In addition, the processor may further obtain, from the compilation result, a system file of the application framework layer after the code update and a system file of the application framework layer before the code update, and then the processor may differentiate the system file of the application framework layer after the code update and the system file of the application framework layer before the code update to generate a second differential package. The processor may combine the first differential package and the second differential package into one patch package, and send the patch package to a terminal, or separately send the first differential package and the second differential package to a terminal. The patch package generated in this way includes only the second differential package of the application framework layer and the first differential package of the target application. In comparison with the prior art, a data volume of the patch package is reduced, air interface resource consumption can be reduced, and using this patch package to perform upgrading by the terminal can also reduce traffic consumption.

In addition, in step 608, the semantic trees are used to compare the different parts in the code, to further subsequently determine whether transposed semantic trees are the same. After the semantic tree is generated, the server may perform an operation on the semantic tree according to a rule, including but not limited to transposing the semantic tree according to a leaf size sorting rule. If the transposed two semantic trees are the same, it may be determined that the difference is unrelated to the code.

It should be noted that the form of a tree does not impose a limitation, and another data structure may be used. For example, a data structure, such as a linked list or an array, that can perform plane or space transformation may be used. For example, step 607 may be replaced with the following: The server separately correspondingly stores constants in functions and corresponding register locations in arrays for the different parts of the first source code and the second source code. Step 608 may be replaced with the following: The server compares the two arrays; and if an array obtained after constants in one array are transposed is the same as the other array, performs step 608; otherwise, jumps to step 610.

In addition, it should be noted that, in FIG. 6A and FIG. 6B, step 607 may not be performed, or step 608 and step 609 may not be performed, or step 608 and step 609 may be performed before step 609, which can also finally reduce a size of a data volume of a finally generated differential package to some extent.

In a possible implementation, in FIG. 6A and FIG. 6B, after step 603 is performed and before step 604 is performed, the processor may directly generate a differential package of the preinstalled application. In this case, step 613 is replaced with the following: The processor combines differential packages of applications other than the target application in the preinstalled applications into a first differential package.

Further, the embodiments of this application provide examples for describing the steps of the patch package generation method in FIG. 6A and FIG. 6B.

Example 1

Assume that a developer changes a function subString(0, 16) of an application framework layer. Refer to the following code section.

---

Try {
arryOfByte=ah.a(locationStringBuilder.toSrting( ).getBytes("utf-8")," . . . " .substring(0,16).getBytes("utf-8"));
}

---

After the function subString(0,16) of the application framework layer is changed, a server compiles Android operating system source code, and a processor of the server obtains a compilation result, and compares an APK of a preinstalled application after the code update and a previous-version APK of the preinstalled application. If it is found through comparison that the two APKs are different, the processor respectively decompiles an .odex file in the APK of the preinstalled application after the code update and an .odex file in the previous-version APK into first source code and second source code. Then the server compares the first source code and the second source code by using a text file comparison tool, to find the following differences (refer to a bold font part).

| | |
|---|---|
| \|move-result-object. v5 | \|move-result-object.v5 |
| \|const-string/jumbo.v6, | \|const-string/jumbo.v6, |
| '"//srting@10637 | '"//srting@10637 |
| \|const/16.v7,#+16 | \|const/4v7,#+0 |
| \|const/4.v8,#+0\| | \|const/16.v8,#+16\| |
| \|invoke-virtual-quick. {v6,v8,v7}, | \|invoke-virtual-quick. {v6,v7,v8}, |
| //vtable@56 | //vtable@56 |
| \|move-result-object.v6 | \|move-result-object.v6 |

Figure 7:
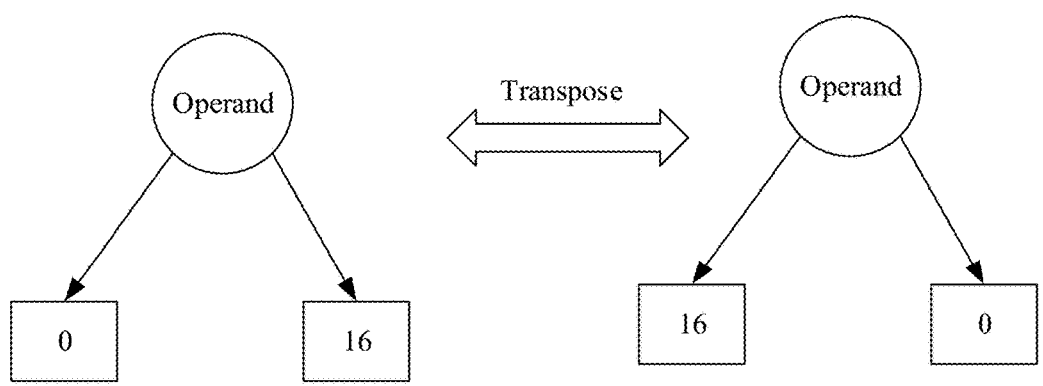
FIG. 7 is a schematic diagram of a semantic tree transposition manner according to an embodiment of this application.

The processor respectively converts the first source code and the second source code into a first semantic tree and a second semantic tree shown in FIG. 7, and the processor determines that the transposed first semantic tree is the same as the second semantic tree.

Alternatively, in another manner, the processor respectively converts the first source code and the second source code into the following arrays:

Array corresponding to the first source code:

$$\begin{Bmatrix} 0, v8 \\ 16, v7 \end{Bmatrix}$$

Array corresponding to the second source code:

$$\begin{Bmatrix} 0, v7 \\ 16, v8 \end{Bmatrix}$$

It can be learned that, in the array obtained by converting the first source code, the constant 0 is stored in v8 and 16 is stored in v7, and in the array obtained by converting the second source code, the constant 0 is stored in v7 and 16 is stored in v8. An array obtained after 0 and 16 in the array corresponding to the first source code are transposed is the same as the array corresponding to the second source code.

If the processor determines that only the foregoing differences exist between the first source code and the second source code, the processor may determine that the preinstalled application is a target application.

Example 2

Assuming that an application framework layer changes an offset address of a function Interface( ), logical implementation of an application calling the function may change. A server compiles Android operating system source code, and a processor of the server obtains a compilation result, and compares an APK of a preinstalled application after the code update and a previous-version APK of the preinstalled application. If it is found through comparison that the two APKs are different, the processor respectively decompiles an .odex file in the APK of the preinstalled application after the code update and an .odex file in the previous-version APK into first source code and second source code. Then the server compares the first source code and the second source code by using a text file comparison tool, to find that offset addresses of the function are different. Therefore, the server determines that code of the preinstalled application changes, and therefore the preinstalled application is not a target application.

Figure 8A:
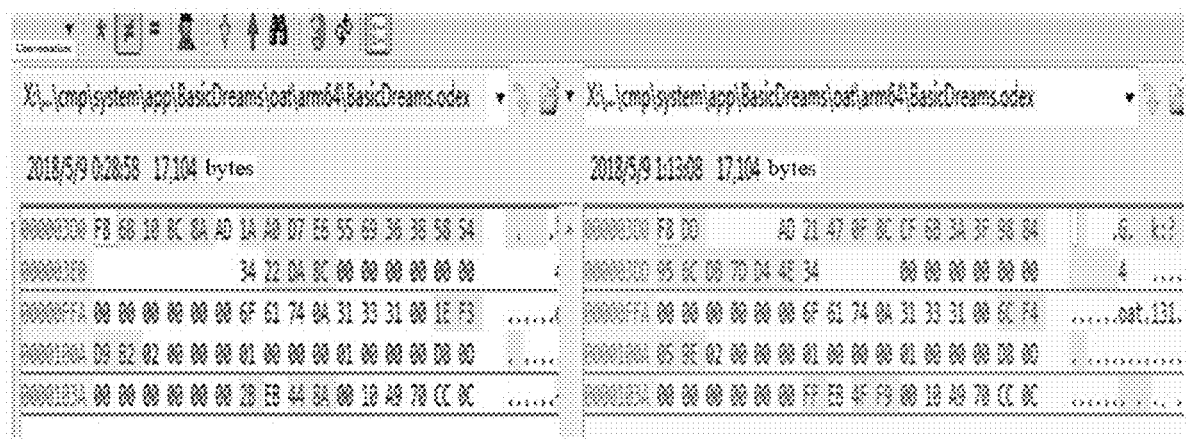
FIG. 8a is a schematic diagram of a text file comparison result according to an embodiment of this application.
Figure 8B:
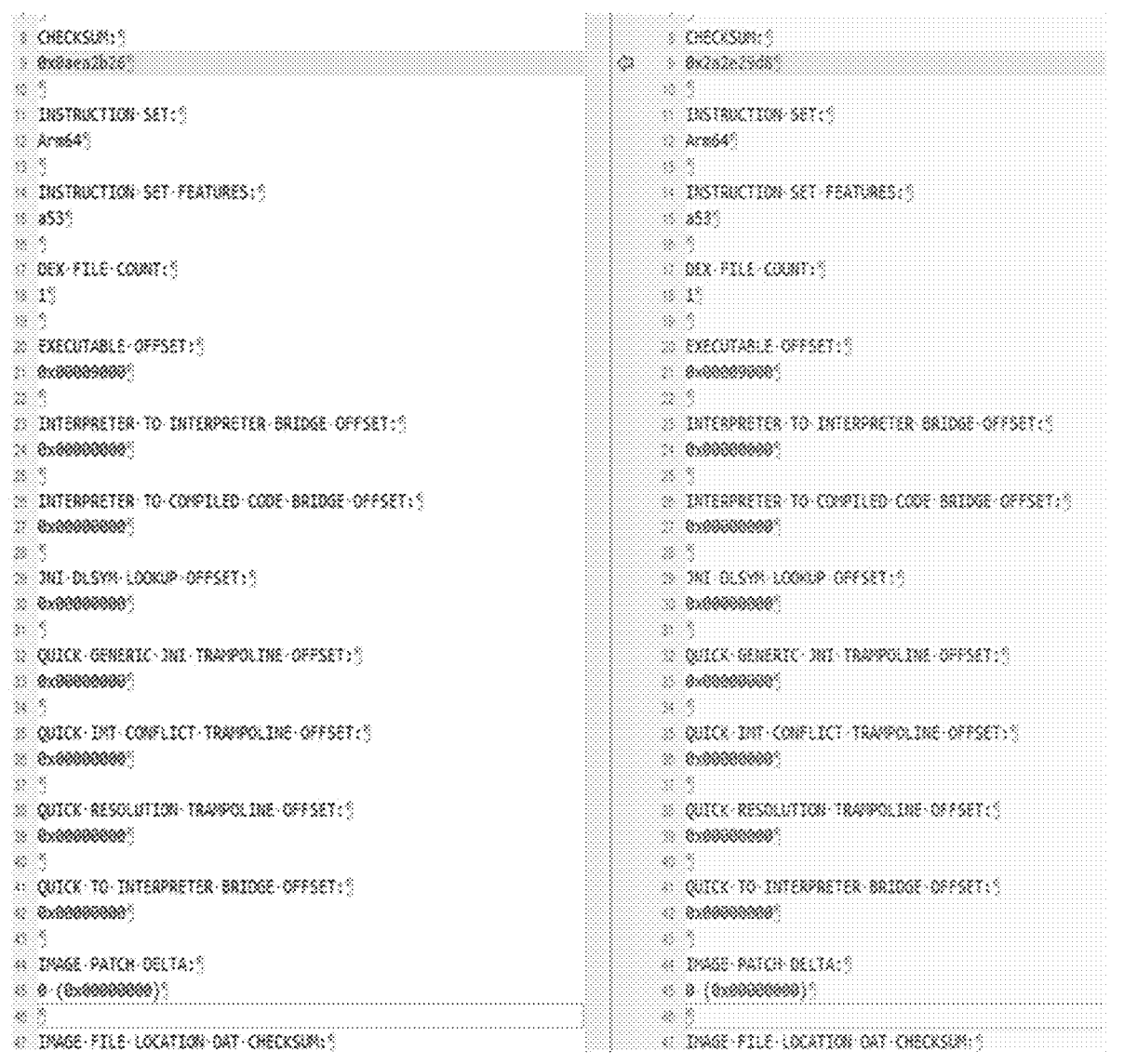

For another example, an application framework layer changes an offset address of a function interface Interface( ), and a preinstalled application B does not call the function interface Interface( ). However, a processor of a server obtains a compilation result, and compares an APK of the preinstalled application B after the code update and a previous-version APK of the preinstalled application B. If it is found through comparison that the two APKs are different, the processor respectively decompiles an .odex file in the APK of the preinstalled application B after the code and an .odex file in the previous-version APK into first source code and second source code. Then the server finds, through comparison by using a comparison tool, that some fields are different between the previous-version .odex file of the preinstalled application B and the new .odex file, as shown in FIG. 8a. The server performs decompilation in FIG. 8a to obtain the first source code and the second source code shown in FIG. 8b. It is found through comparison that values corresponding to check value fields of an image file of the application framework layer in the ninth row are different. Therefore, the server determines that code of the preinstalled application B does not change, and therefore the preinstalled application B is a target application.

Figure 9A:
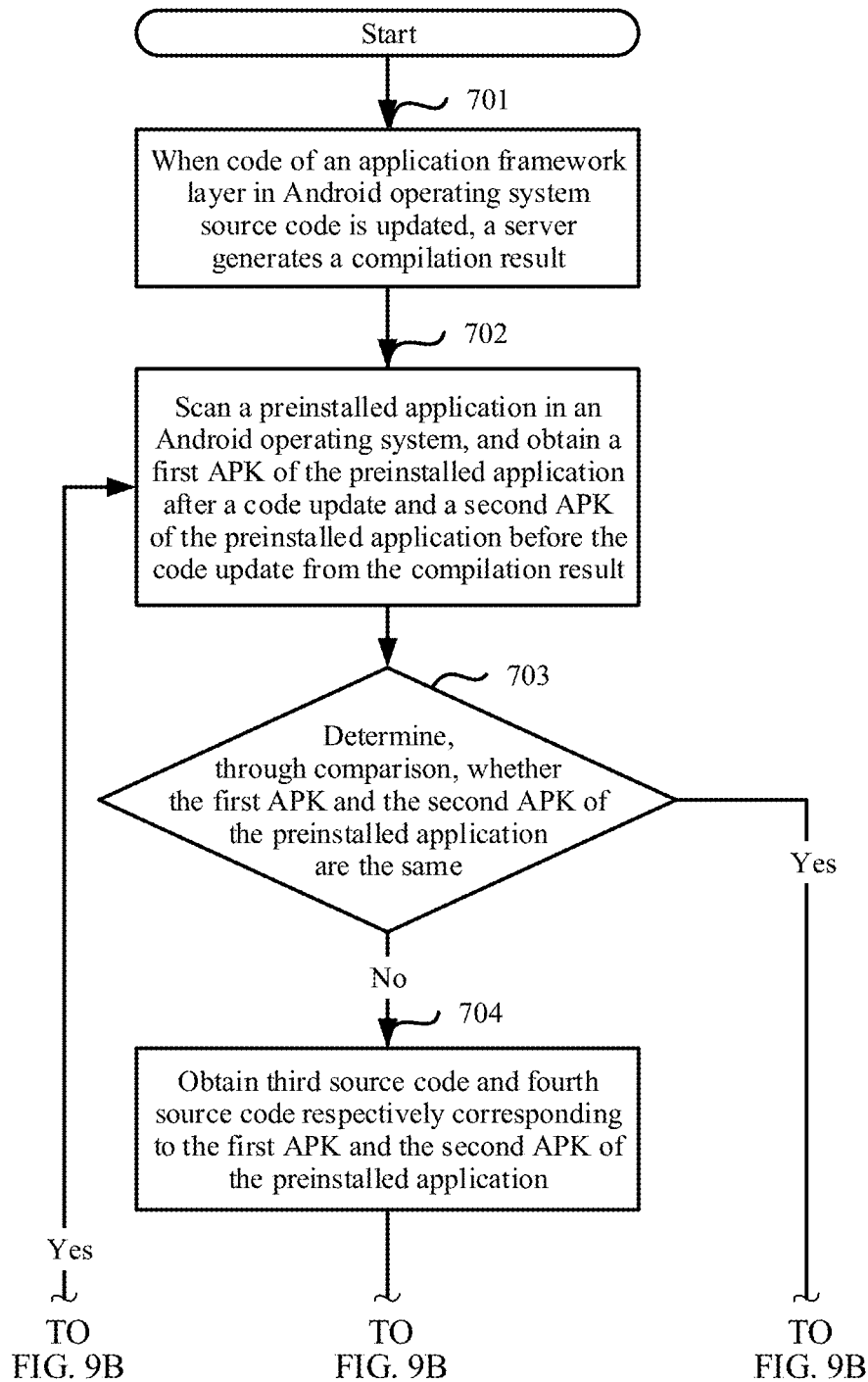
FIG. 9A and FIG. 9B are a schematic flowchart 1 of another patch package generation method according to an embodiment of this application.
Figure 9B:
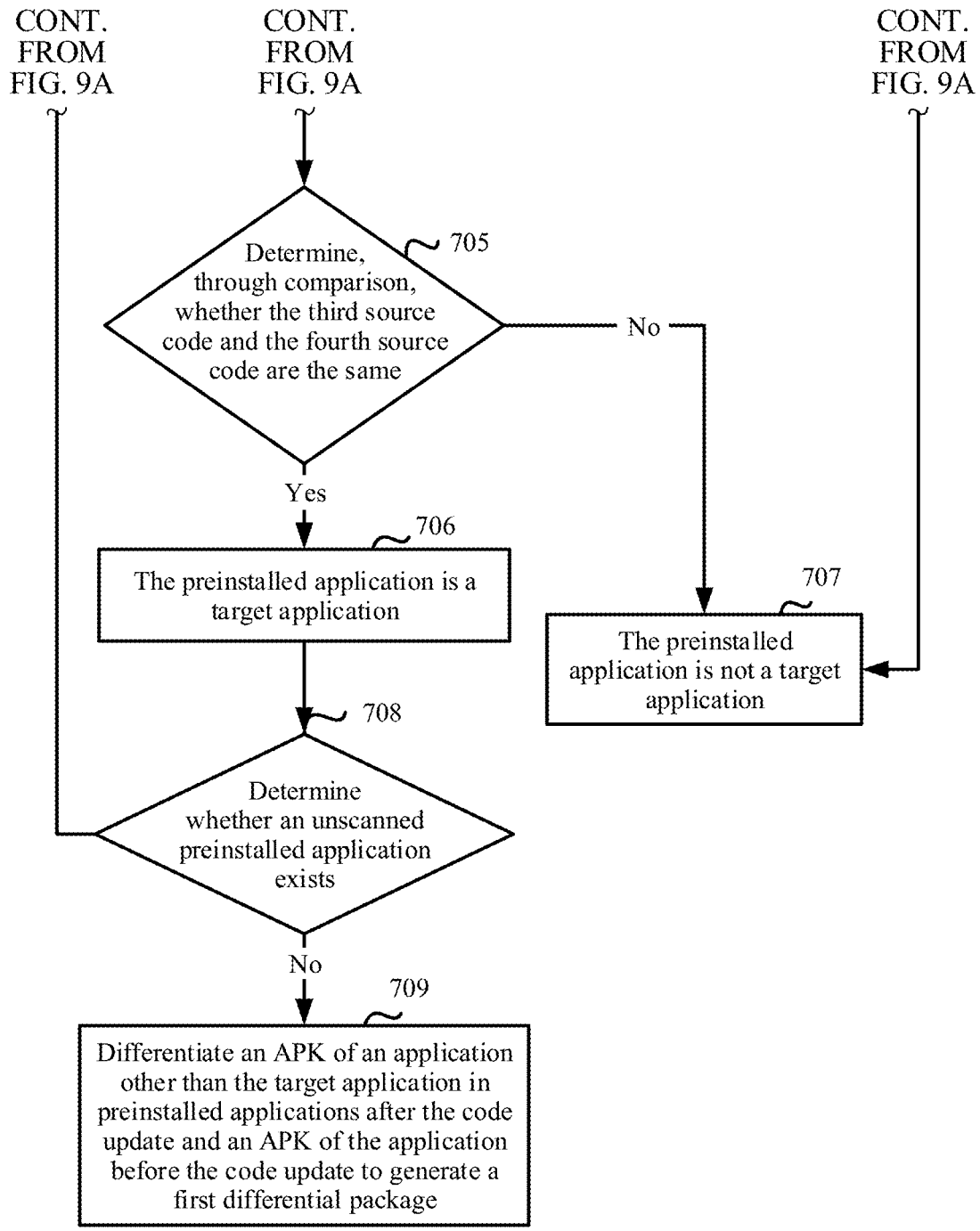

FIG. 9A and FIG. 9B are a schematic flowchart of another patch package generation method according to an embodiment of this application. The steps are as follows.

Step 701: When code of an application framework layer in Android operating system source code is updated, a processor of a server generates a compilation result, where the compilation result includes APKs of preinstalled applications in an application layer in the Android operating system source code after the code update. The compilation result is stored in a memory of the server. In addition, the memory further stores APKs of the preinstalled applications in the application layer in the Android operating system source code before the code update.

Step 702: The processor scans an APK of a preinstalled application in the compilation result. For example, if the preinstalled application is a second application, the processor obtains, from the memory, a first APK of the second application after the code update and a second APK of the second application before the code update.

Step 703: The processor determines, through comparison, whether the APKs of the preinstalled application before and after the code update are the same; and if the APKs of the preinstalled application before and after the code update are different, continues to perform step 704 to step 709; otherwise, jumps to step 708.

Step 704: The processor obtains, from the Android operating system source code, third source code of the preinstalled application after the code update and fourth source code of the preinstalled application before the code update.

For example, if the preinstalled application is a second application, the processor obtains, from the Android operating system source code, third source code of the second application after the code update and fourth source code of the second application before the code update.

Step 705: The processor determines, through comparison, whether the third source code and the four source code of the preinstalled application are the same; and if the third source code and the four source code of the preinstalled application are the same, performs step 706 to step 709; otherwise, jumps to step 707.

Step 706: The processor determines that the preinstalled application is a target application.

Step 707: The processor determines that the preinstalled application is not a target application.

Step 708: The processor determines whether an unscanned preinstalled application exists in the compilation result, and if yes, performs step 702 to step 611 again.

Step 709: The processor determines an application other than the target application in the preinstalled applications, and differentiates an APK of the application after the code update and an APK of the application before the code update to generate a first differential package.

In addition, the processor may further obtain, from the compilation result, a system file of the application framework layer after the code update and a system file of the application framework layer before the code update. The processor may differentiate the system file of the application framework layer after the code update and the system file of the application framework layer before the code update, to generate a second differential package. The processor may combine the first differential package and the second differential package into one patch package, and send the patch package to a terminal, or separately send the first differential package and the second differential package to a terminal. The patch package generated in this way includes only the second differential package of the application framework layer and the first differential package of the target application. In comparison with the prior art, a data volume of the patch package is reduced, air interface resource consumption can be reduced, and using this patch package to perform upgrading by the terminal can also reduce traffic consumption.

In a possible implementation, in FIG. 9A and FIG. 9B, after step 703 is performed and before step 704 is performed, the processor may directly generate a differential package of the preinstalled application. In this case, step 709 is replaced with the following: The processor combines differential packages of applications other than the target application in the preinstalled applications into a first differential package.

Figure 10:
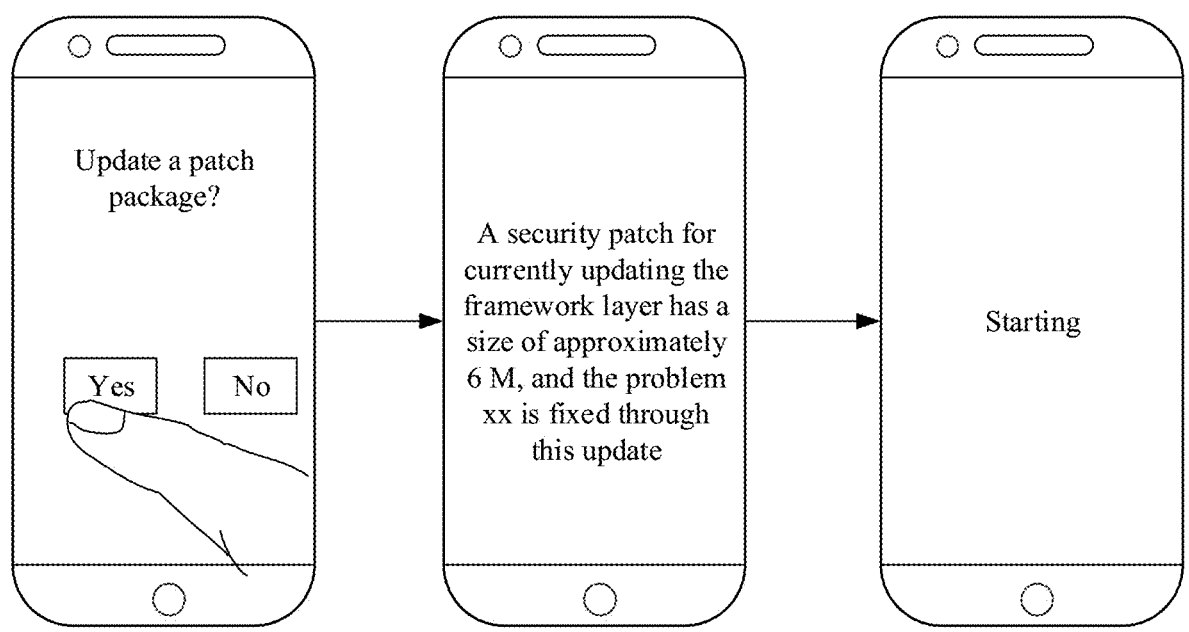
FIG. 10 is a schematic diagram of an interface of updating a patch package by a terminal according to an embodiment of this application.

In this way, after the server generates a security patch of the application framework layer through the foregoing steps, when a user manually chooses to update a patch package or the terminal periodically automatically updates a patch package, the terminal may obtain the patch package from the server and performs updating. As shown in FIG. 10, after the end user manually chooses to update a patch package, a prompt box pops up on the terminal, where content of the prompt box includes "A security patch for currently updating the application framework layer has a size of approximately 6 M, and a problem is fixed through this update", and the like. Then the terminal restarts, and after the terminal restarts, the security patch of the application framework layer takes effect.

In conclusion, the server determines, from preinstalled applications in operating system source code, target applications that change only in a check value, a timestamp, and a register corresponding to a constant. After determining the target applications, the server generates a first differential package of an application other than these target applications in the preinstalled applications. In this way, in comparison with the prior art, a data volume of the first differential package generated by the server is relatively small, thereby reducing an amount of computation of running a patch package by the terminal, reducing air interface resource consumption, and increasing upgrade efficiency.

A person skilled in the art may clearly understand that, descriptions of the embodiments provided in the present application may be reference for each other. For ease and brevity of description, for functions of the apparatuses and devices and performed steps that are provided in the embodiments of this application, refer to related descriptions in the method embodiment of the present application. Details are not described herein again.

A person skilled in the art may further understand that various illustrative logical blocks and steps that are listed in the embodiments of this application may be implemented by using electronic hardware, computer software, or a combination thereof. In order to clearly display the interchangeability between the hardware and the software, functions of the foregoing various illustrative components and steps have been generally described. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments of this application.

The various illustrative logical blocks, modules, and circuits described in the embodiments of this application may implement or operate the described functions by using a general processing unit, a digital signal processing unit, an application-specific integrated circuit (ASIC), a field programmable gate array (FPGA) or another programmable logical apparatus, a discrete gate or transistor logic, a discrete hardware component, or a design of any combination thereof. The general processing unit may be a micro processing unit. The general processing unit may be any conventional processing unit, controller, microcontroller, or state machine. The processing unit may be implemented by a combination of computing apparatuses, such as a digital signal processing unit and a micro processing unit, a plurality of micro processing units, one or more micro processing units with a digital signal processing unit core, or any other similar configuration.

Steps of the methods or algorithms described in the embodiments of this application may be directly embedded into hardware, a software module executed by a processing unit, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processing unit, so that the processing unit can read information from the storage medium and write information to the storage medium. Alternatively, the storage medium may further be integrated into a processing unit. The processing unit and the storage medium may be arranged in an ASIC, and the ASIC may be arranged in a user terminal. Alternatively, the processing unit and the storage medium may be arranged in different components of the user terminal.

In one or more example designs, the functions described in the embodiments of this application may be implemented by using hardware, software, firmware, or any combination thereof. If the present application is implemented by software, these functions may be stored in a computer readable medium or are transmitted to the computer readable medium in the form of one or more instructions or code. The computer readable medium is either a computer storage medium or a communications medium that enables a computer program to move from one place to another. The storage medium may be an available medium that may be accessed by any general or special computer. For example, such a computer readable medium may include but is not limited to a RAM, a ROM, an EEPROM, a CD-ROM, or another optical disc storage, a disk storage or another magnetic storage apparatus, or any other medium that may be used to bear or store program code, where the program code is in the form of an instruction or a data structure or in a form that can be read by a general or special computer or a general or special processing unit. In addition, any connection may be appropriately defined as a computer readable medium. For example, if software is transmitted from a website, a server, or another remote resource through a coaxial cable, an optical fiber computer, a twisted pair, a digital subscriber line (DSL) or in a wireless manner, such as infrared, radio, or microwave, the software is included in a defined computer readable medium. The disk and the disc include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer readable medium.

According to the foregoing description in this application, technologies in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs but may also be extended to a maximum scope that is consistent with the principles and disclosed new features of this application.

What is claimed is:

1. A patch package generation method, comprising:
    when code of an application framework layer in Android operating system source code is updated, obtaining, by a server, a compilation result that comprises Android packages (APKs) of preinstalled applications in an application layer in the Android operating system source code after the code of the application framework layer is updated, and APKs of the preinstalled applications in the application layer in the Android operating system source code before the code of the application framework layer is updated;
    determining, by the server, an APK of a target application from the APKs of the preinstalled applications, wherein the target application is an application comprising code in which only one or more of a check value, a timestamp, and a register corresponding to a constant; and
    differentiating, by the server, an APK of an application other than the target application in the preinstalled applications after the code of the application framework layer is updated and an APK of the application other than the target application in the preinstalled applications before the code of the application framework layer is updated, to generate a first differential package;
    wherein the compilation result obtained by the server further comprises a system file of the application framework layer after the code of the application framework layer is updated and a system file of the application framework layer before the code of the application framework layer is updated; and
    wherein the method further comprises:
    differentiating, by the server, the system file of the application framework layer after the code of the application framework layer is updated and the system file of the application framework layer before the code of the application framework layer is updated, to generate a second differential package; and
    combining, by the server, the first differential package and the second differential package into one patch package, and sending the patch package to a terminal; or
    separately sending, by the server, the first differential package and the second differential package to the terminal.

2. The method according to claim 1, wherein determining the APK of the target application from the APKs of the preinstalled applications comprises:
    obtaining, by the server from the compilation result, an APK of a first application after the code of the application framework layer is updated and an APK of the first application before the code of the application framework layer is updated, wherein the first application is one of the preinstalled applications;
    when determining that the APKs of the first application before and after the code of the application framework layer is updated are different, decompiling, by the server, a system file in the APK of the first application after the code of the application framework layer is updated into first source code, and decompiling a system file in the APK of the first application before the code of the application framework layer is updated into second source code;
    determining, by the server, whether the first source code and the second source code differ only in one or more of the check value, the timestamp, and the register corresponding to the constant; and
    in response to determining that the first source code and the second source code differ only in one or more of the check value, the timestamp, and the register, determining, by the server, that the first application is the target application, and determining that the APK of the first application is the APK of the target application.

3. The method according to claim 2, wherein determining whether the first source code and the second source code differ only in one or more of the check value, the timestamp, and the register comprises:
    determining, by the server through comparison, whether the first source code is different from the second source code;
    in response to determining that the first source code is different from the second source code, converting, by the server, the first source code into a first semantic tree and converting the second source code into a second semantic tree; and
    when a transpose of the first semantic tree is the same as the second semantic tree, determining, by the server, that the first source code and the second source code differ only in the register corresponding to the constant.

4. The method according to claim 2, wherein determining whether the first source code and the second source code differ only in one or more of the check value, the timestamp, and the register comprises:
    determining, by the server through comparison, whether the first source code is different from the second source code;
    in response to determining that the first source code is different from the second source code, determining, by the server, whether a field corresponding to different code parts of the first source code and the second source code is a timestamp field; and
    in response to determining that the field corresponding to the different code parts of the first source code and the second source code is the timestamp field, determining, by the server, that the first source code and the second source code differ only in the check value.

5. The method according to claim 2, wherein determining whether the first source code and the second source code differ only in one or more of the check value, the timestamp, and the register comprises:
  determining, by the server through comparison, whether the first source code is different from the second source code;
  in response to determining that the first source code is different from the second source code, determining, by the server, whether a field corresponding to different code parts of the first source code and the second source code is a check value field; and
  in response to determining that the field corresponding to the different code parts of the first source code and the second source code is the check value field, determining, by the server, that the first source code and the second source code differ only in the timestamp.

6. The method according to claim 1, wherein determining the APK of the target application from the APKs of the preinstalled applications comprises:
  obtaining, by the server from the compilation result, an APK of a second application after the code of the application framework layer is updated and an APK of the second application before the code of the application framework layer is updated, wherein the second application is one of the preinstalled applications;
  when determining that the APKs of the second application before and after the code of the application framework layer is updated are different, obtaining, by the server from the Android operating system source code, third source code of the second application after the code of the application framework layer is updated and fourth source code of the second application before the code of the application framework layer is updated; and
  when finding, through comparison, that the third source code is the same as the fourth source code, determining, by the server, that the second application is the target application, and determining that the APK of the second application is the APK of the target application.

7. A server, comprising:
  a processor and a memory, wherein
  the memory is configured to store one or more computer programs, and further store a compilation result generated by compiling Android operating system source code that comprises code of an application program framework layer, and the compilation result comprises APKs of preinstalled applications in an application layer in the Android operating system source code after code update and APKs of the preinstalled applications in the application layer in the Android operating system source code before the code update;
  when the one or more computer programs stored in the memory are executed by the processor, the server is enabled to:
  when the code of the application framework layer in the Android operating system source code is updated, obtain the compilation result;
  determine an APK of a target application from the APKs of the preinstalled applications, wherein the target application is an application comprising code in which only one or more of a check value, a timestamp, and a register corresponding to a constant; and
  differentiate an APK of an application other than the target application in the preinstalled applications after the code of the application framework layer is updated and an APK of the application other than the target application in the preinstalled applications before the code of the application framework layer is updated, to generate a first differential package;
  wherein the compilation result stored in the memory further comprises a system file of the application framework layer after the code of the application framework layer is updated and a system file of the application framework layer before the code of the application framework layer is updated, and the server further comprises a transceiver; and
  when the one or more computer programs stored in the memory are executed by the processor, the server is further enabled to:
  differentiate the system file of the application framework layer after the code of the application framework layer is updated and the system file of the application framework layer before the code of the application framework layer is updated, to generate a second differential package;
  combine the first differential package and the second differential package into one patch package; and
  send the patch package to a terminal through the transceiver, or separately send the first differential package and the second differential package to a terminal through the transceiver.

8. The server according to claim 7, wherein when the one or more computer programs stored in the memory are executed by the processor, the server is further enabled to:
  obtain, from the compilation result, an APK of a first application after the code of the application framework layer is updated and an APK of the first application before the code of the application framework layer is updated, wherein the first application is one of the preinstalled applications;
  when determining that the APKs of the first application before and after the code of the application framework layer is updated are different, decompile a system file in the APK of the first application after the code of the application framework layer is updated into first source code, and decompile a system file in the APK of the first application before the code of the application framework layer is updated into second source code;
  determine whether the first source code and the second source code differ only in one or more of the check value, the timestamp, and the register corresponding to the constant; and
  if the first source code and the second source code differ only in one or more of the check value, the timestamp, and the register, determine that the first application is the target application, and determine that the APK of the first application is the APK of the target application.

9. The server according to claim 8, wherein when the one or more computer programs stored in the memory are executed by the processor, the server is further enabled to:
  determine, through comparison, whether the first source code is different from the second source code;
  if the first source code is different from the second source code, convert the first source code into a first semantic tree and convert the second source code into a second semantic tree; and
  if a transpose of the first semantic tree is the same as the second semantic tree, determine that the first source code and the second source code differ only in the register corresponding to the constant.

10. The server according to claim 8, wherein when the one or more computer programs stored in the memory are executed by the processor, the server is further enabled to:

determine, through comparison, whether the first source code is different from the second source code;
if the first source code is different from the second source code, determine whether a field corresponding to different code parts of the first source code and the second source code is a timestamp field; and
if the field corresponding to the different code parts of the first source code and the second source code is the timestamp field, determine that the first source code and the second source code differ only in the check value.

11. The server according to claim 8, wherein when the one or more computer programs stored in the memory are executed by the processor, the server is further enabled to:
determine, through comparison, whether the first source code is different from the second source code;
if the first source code is different from the second source code, determine whether a field corresponding to different code parts of the first source code and the second source code is a check value field; and
if the field corresponding to the different code parts of the first source code and the second source code is the check value field, determine that the first source code and the second source code differ only in the timestamp.

12. The server according to claim 7, wherein the memory further stores the Android operating system source code, and the Android operating system source code comprises source code of the preinstalled applications in the application layer in the Android operating system source code after the code of the application framework layer is updated and source code of the preinstalled applications in the application layer in the Android operating system source code before the code of the application framework layer is updated; and
when the one or more computer programs stored in the memory are executed by the processor, the server is further enabled to:
obtain, from the compilation result, an APK of a second application after the code of the application framework layer is updated and an APK of the second application before the code of the application framework layer is updated, wherein the second application is one of the preinstalled applications;
when determining that the APKs of the second application before and after the code of the application framework layer is updated are different, obtain, from the Android operating system source code, third source code of the second application after the code of the application framework layer is updated and fourth source code of the second application before the code of the application framework layer is updated; and
when finding, through comparison, that the third source code is the same as the fourth source code, determine that the second application is the target application, and determine that the APK of the second application is the APK of the target application.

13. A non-transitory computer storage medium comprising a computer program, and when the computer program is run on a server, the server is enabled to perform operations, the operations comprising:
when code of an application framework layer in Android operating system source code is updated, obtaining a compilation result that comprises Android packages (APKs) of preinstalled applications in an application layer in the Android operating system source code after the code of the application framework layer is updated, and APKs of the preinstalled applications in the application layer in the Android operating system source code before the code of the application framework layer is updated;
determining an APK of a target application from the APKs of the preinstalled applications, wherein the target application is an application comprising code in which only one or more of a check value, a timestamp, and a register corresponding to a constant; and
differentiating an APK of an application other than the target application in the preinstalled applications after the code of the application framework layer is updated and an APK of the application other than the target application in the preinstalled applications before the code of the application framework layer is updated, to generate a first differential package;
wherein the compilation result further comprises a system file of the application framework layer after the code of the application framework layer is updated and a system file of the application framework layer before the code of the application framework layer is updated; and
wherein the operations further comprise:
differentiating the system file of the application framework layer after the code of the application framework layer is updated and the system file of the application framework layer before the code of the application framework layer is updated, to generate a second differential package; and
combining the first differential package and the second differential package into one patch package, and sending the patch package to a terminal; or
separately sending the first differential package and the second differential package to a terminal.

* * * * *